Figure 1:
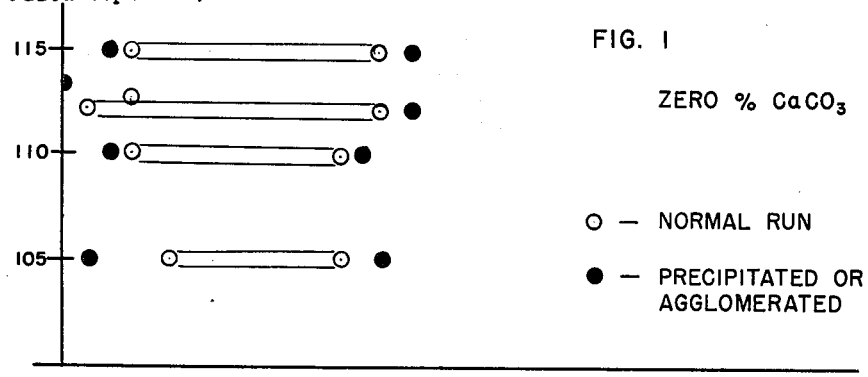

Aug. 9, 1955 J. M. GRIM 2,715,118
SUSPENSION POLYMERIZATION USING SYNTHETIC CALCIUM PHOSPHATE
Filed Sept. 19, 1951 2 Sheets-Sheet 1

ZERO % $CaCO_3$

○ — NORMAL RUN

● — PRECIPITATED OR AGGLOMERATED 9.45 % $CaCO_3$

12 % $CaCO_3$

% $CaCl_2$

% EXTENDER x 1000

*INVENTOR.*
JOHN M. GRIM
BY
HIS ATTORNEY

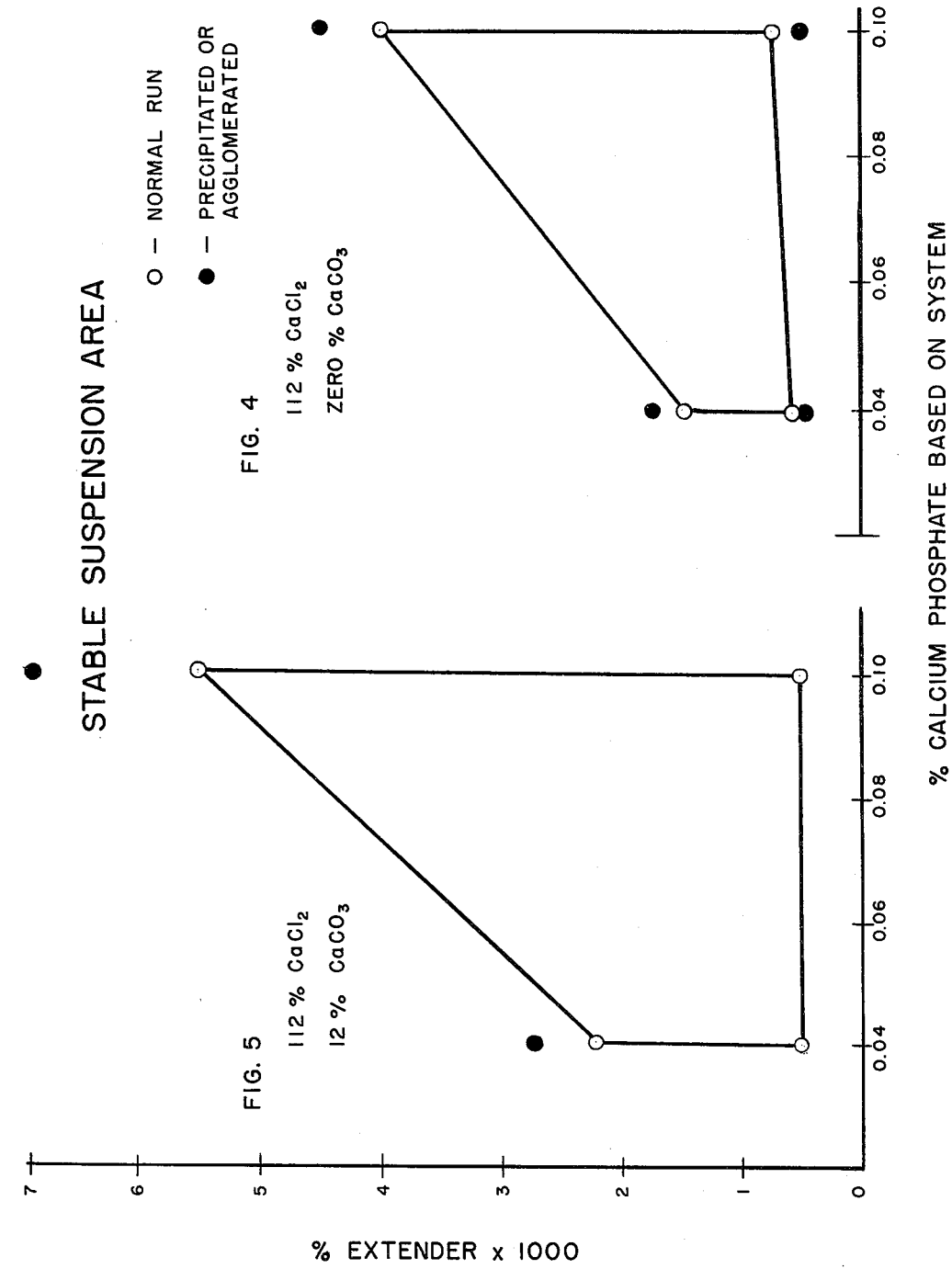

United States Patent Office 2,715,118
Patented Aug. 9, 1955

2,715,118

SUSPENSION POLYMERIZATION USING SYNTHETIC CALCIUM PHOSPHATE

John Marshall Grim, Lancaster, Pa., assignor to Koppers Company, Inc., a corporation of Delaware Application September 19, 1951, Serial No. 247,325

22 Claims. (Cl. 260—93.5)

This invention relates to polymerization and is particularly directed to new and improved methods of producing bead-shaped polymeric materials.

Generally, bead-shaped polymeric materials, hereinafter referred to as "bead polymers," are formed in suspension polymerization, which is sometimes designated as pearl polymerization, bead polymerization or granular polymerization. In these processes, a polymerizable ethylenic monomer is dispersed or suspended in an immiscible liquid, such as water, in such a way that on completion of the process the polymer settles out as spherical particles or beads.

It is known that the formation of bead polymers of polymerizable ethylenic monomers may be accomplished with an aqueous suspension of the monomer in the presence of a dispersing agent which helps to keep the globules of monomer dispersed during the polymerization. Calcium phosphate has been proposed as a dispersing agent for this purpose because of its ability to function as a suspension stabilizer or agglomeration inhibitor. Under very restrictive conditions or attendant disadvantages, calcium phosphate tends to prevent or diminish the tendency of the globules of the dispersed polymerizing monomer or polymerization product to agglomerate or coalesce during the polymerization.

It is now known that calcium phosphate is not completely satisfactory for this purpose, and generally the present practice of suspension polymerization with it is accompanied by a number of serious limitations. Firstly, calcium phosphate may be unpredictable and erratic in its performance and efficiency in these polymerizations. In fact, the same chemical entity obtained from different manufacturers, and sometimes even from the same manufacturer, may be sharply contrasting in its utility for this purpose.

Secondly, the productive capacity of suspension polymerization equipment is restricted to a relatively low output because of the low monomer/water ratio which is required in order to obtain bead polymers of desired properties for molding. In producing polymers of sufficient molecular weight to give the desired properties, it is necessary under present practice to use a low monomer/water ratio to prevent the dispersed globules from coalescing completely during the period required to obtain the desired polymerization.

On the other hand, and thirdly, if it is desired to increase the output of the given equipment by increasing the monomer/water ratio, it is found that the critical, sticky or gummy phase of the polymerization process, which is claimed to occur somewhere between 20 and 70 per cent conversion of styrene to polymer, must be made relatively short in duration by the use of large amounts of catalyst. These large amounts of catalyst apparently speed the polymerization through the sticky phase before the globules have the opportunity to coalesce completely, but the resultant high polymerization rates produce polymers having molecular weights lower than desired in polymers to be used in the molding trade.

These disadvantages have been in a large measure overcome by the use of sub-micronic size particles as described in my presently copending application, Serial Number 786,655. Additionally, there has been disclosed in that application the utility of surface-active agents as extenders for the suspending agents which increases their usefulness, for example to control bead size, etc.

In addition, it has been observed that the degree of polymerization can be increased and the polymerization time cycle materially shortened by heating the polymerization suspension to a temperature in excess of approximately 100° C. after substantial polymerization has taken place at a temperature of 90° C. or below. However, calcium phosphate does not give uniform results as a dispersing agent when the temperature is so raised and agglomeration or precipitation is sometimes encountered.

The general purpose and object of the present invention is to circumvent, simply and effectively, the above-described limitations of suspension polymerization processes employing calcium phosphate as a dispersing agent, or suspension stabilizer, so that existing or contemplated installations can be optionally employed to produce, as required, either high or low outputs of bead polymers having either high or low molecular weights. Still other objects are to provide polymerization suspensions which are substantially insensitive to irregularities in composition or in physical operating conditions, to provide improved control of bead size and provide processes in which reproducible results can be obtained consistently. A particular object of the invention is to provide means for improving the stability of polymerization suspensions utilizing calcium phosphate as a dispersing agent over a wider and a more varying scope of operating conditions than is presently known in the art. The invention has for further objects such other improvements and such other operative advantages as may be found to result from the methods and apparatus hereinafter described or claimed.

The aforestated objects and others, which will become apparent from the description, are accomplished by utilizing a synthetically prepared calcium phosphate suspending agent in which there is present an "additive" such as calcium chloride in approximately 5 to 15 per cent excess based on the calcium phosphate present. It has been discovered as a feature of this invention that the presence of calcium chloride increases the operable range of the "extended phosphate dispersing agent." Further, the use of such synthetically prepared calcium phosphate dispersing agent eliminates such undesirable impurities as iron, silicates, and acid insolubles which occur in commercial calcium phosphate and which tend to contaminate the polymer beads. Additionally, it has been discovered as a feature of this invention that the addition of small amounts of calcium carbonate to the synthetically prepared calcium phosphate containing calcium chloride further increases the operable range of the "extended phosphate dispersing agents" and also increases the stability of the polymerization suspension in the temperature range above 100° C., and in particular, the range 110°–120°, which temperature is utilized in order to reduce the amount of residual monomer in the polymer bead and to reduce the polymerization time.

The synthetic calcium phosphate can be prepared by precipitation methods, for example, metathesis or double decomposition reactions. Thus, for example, calcium chloride can be reacted with trisodium phosphate or phosphoric acid can be added to calcium hydroxide. For convenience of handling, it is preferred to admix filtered solutions of calcium chloride and trisodium phosphate and to precipitate the calcium phosphate. Conveniently, an amount of calcium chloride solution equivalent to 105–115 per cent of the trisodium phosphate can be utilized so that the calcium chloride "additive" is present in the suspending medium (100% = 10 moles calcium chloride per 6 moles phosphate radical ($PO_4$) present). Good results are obtained by adding such solutions to the bulk of the water used in the polymerization suspension at approximately 60° C., although this temperature is not critical. Preferably, the trisodium phosphate is added to the water with agitation and thereafter the calcium chloride solution is added with agitation. To this mixture there is added an "extender," the monomer or monomers, the catalyst, and, if desired, the calcium carbonate.

In the practice of this invention the amount of calcium phosphate dispersing agent may be varied widely in accordance with the activity of the dispersing agent, the size of the beads desired, the amount of extender or surface-active agent used, etc. Generally, however, the amount will be between 0.035% and about 5% by weight or more of the polymerizable composition, although ordinarily not more than about 1% will be necessary.

It has been observed that calcium carbonate, when present in from approximately 5 to 15 percent, and preferably 12 per cent, based on the calcium phosphate present, gives excellent results. It will be realized that the buffer, calcium carbonate, can be added to the phosphate slurry or can be prepared in situ by adding the desired amount of sodium carbonate to the trisodium phosphate and adding an equivalent amount of calcium chloride. Preferably the buffer is added after substantial polymerization has occurred. In general this occurs when the polymerization has proceeded for approximately 6 hours at 90° C. under catalytic conditions equivalent to that obtained with 0.2% benzoyl peroxide. More broadly substantial polymerization is that polymerization which has occurred when the polymerization approaches the sticky or gummy phase above referred to.

In the preferred embodiment of the invention, the polymerization is carried out with agitation at approximately 90° C. for about 6—7 hours and the calcium carbonate is added at the sixth hour. Thereafter, the polymerization is completed by heating the suspension at about 110–115° C. for approximately 3 to 5 hours. It is to be understood that other polymerization temperatures can be used within the scope of the invention. The preferred embodiment sets forth a relatively short polymerization cycle giving low residual monomer. This can also be achieved by using lower temperature and a longer heating period.

The "extenders" are organic compounds which, when present in an aqueous solution is sufficient concentration, have the property of effecting a change in surface phenomena such as the surface tension of the solution medium. These agents, as is well known in the art, function by virtue of an organophylic group associated with a hydrophylic group. "Anionic surface-active agents" are those surface-active agents in which the organophylic group is contained in an anion. For example, the organophylic group may form part of a carboxylate, sulfonate, or sulfate anion. Thus, "anionic surface-active agents" which have been found useful as "extenders" in the practice of this invention include such diverse compounds as dodecylbenzene sodium sulfonate, sodium caproate, oleic acid and ortho-carboxybenzene-azo-dimethylaniline. It appears, however, that the more active surface-active agents are the more effective "extenders" according to the invention. Dodecylbenzene sodium sulfonate, for example, is particularly effective. Organic sulfates and sulfonates, such as long chain alkyl sulfates and sulfonates as obtained by the sulfation or sulfonation of alcohols and hydrocarbons; alkali sulfite-addition products of neutral esters of unsaturated polycarboxylic acids; alkyl aromatic sulfonates such as obtained by the sulfonation of alkylated aromatic hydrocarbons; and aryl alkyl polyether sulfonates such as obtained by the sulfonation of the condensation products of ethylene oxide and alkyl phenols, are also particularly effective.

While no attempt is made to explain the phenomena by which the anionic surface-active agent, or "extender," operates, it is believed that its ability to control flocculation of the phosphate particles is directly connected with its utility in "extending" the dispersing properties of the phosphates in accordance with the invention. Moreover, these phosphate dispersing agents are "extended" by specific effective ranges of concentrations of the anionic surface-active agents. In concentrations below or above these ranges, the anionic surface-active agents are not effective for this purpose and in too high concentrations may have an adverse effect. In fact, concentrations of usrface-active agents higher than these ranges permit the formation of agglomerates. The use of the term "extended phosphate dispersing agent" is intended to mean, therefore, a phosphate dispersing agent used in association with the proper concentration of anionic surface-active agent for "extending" or expanding its utility or function as a dispersing agent. These limits and ranges of concentrations will be discussed and illustrated hereinafter.

The term "extending concentrations," includes those concentrations of anionic surface-active agent which, in the presence of an employed phosphate dispersing agent, do not materially affect the surface tension of the aqueous phase. The lower limits on "extending concentrations" are those concentrations below which the anionic surface-active agent has no apparent effect on the phosphate dispersing agents according to the invention. The reference to surface tension applies to surface tension of the aqueous phase during the polymerization. For example, with highly active surface-active materials there may be a temporary, initial lowering of the surface tension by about 5–10 dynes per centimeter, as measured by a Du Nouy tensiometer. This initial lowering is not consequential, however, since the surface tension resumes its original value after the polymerization has proceeded for some time. A wide variety of anionic surface-active agents may be used to extend the phosphate dispersing agent according to the invention. For example, suitable surface-active agents are dodecylbenzene sodium sulfonate (Nacconol NRSF), sodium tetradecyl sulfate (Tergitol 04), sodium pentadecyl sulfate (Tergitol 07), sodium octyl sulfate (Tergitol 08), sodium salt of aryl alkyl polyether sulfonate (Triton 720), oleic acid, crude sodium oleate (saponified red oil), sodium laurate, sodium caprate, sodium caprylate, sodium caproate, potassium stearate, calcium oleate (precipitated in situ from sodium oleate and $CaCl_2$), calcadur-red 8BL-diazo dye (sodium salt of 3,3'-disulfodiphenyl-urea - 4,4'-diazo-bis-amino - 8-naphthol - 6-sulfonic acid), azosol-fast orange 3RA-monoazo dye (ortho-carboxy-benzene-azo-dimethylaniline), and brilliant carmine L (sodium salt of 2,5,2',5'-tetramethyl-triphenyl methane-4,4'-diazo-bis-beta-naphthol-disulfonic acid).

It will be noted that the range of these extenders is increased by the presence of an additive, for example, calcium chloride. Figure 1 illustrates the increased range of extender (dodecylbenzene sodium sulfonate) as the calcium chloride content is varied. It will be noted that approximately 112 per cent calcium chloride, gives a desirable extender range. 112% calcium chloride as here used indicates the presence of 12% calcium chloride where 100% = 10 moles $CaCl_2$ per 6 molecular equivalents of phosphate radical present. 100% calcium chloride has been utilized in the preparation of the calcium phosphate suspending agent (see Example I). The ratio of 10 moles $CaCl_2$ to 6 molecular equivalents of phosphate radical satisfies the hydroxy apatite equation.

$$10CaCl_2 + 6Na_3PO_4 + 2H_2O \rightarrow 3Ca_3(PO_4)_2 \cdot Ca(OH)_2 + 18NaCl + 2HCl$$

It has been established by X-ray diffraction observations that hydroxy apatite is obtained when 10 moles calcium chloride or more are reacted with 6 moles trisodium phosphate.

Figure 2:
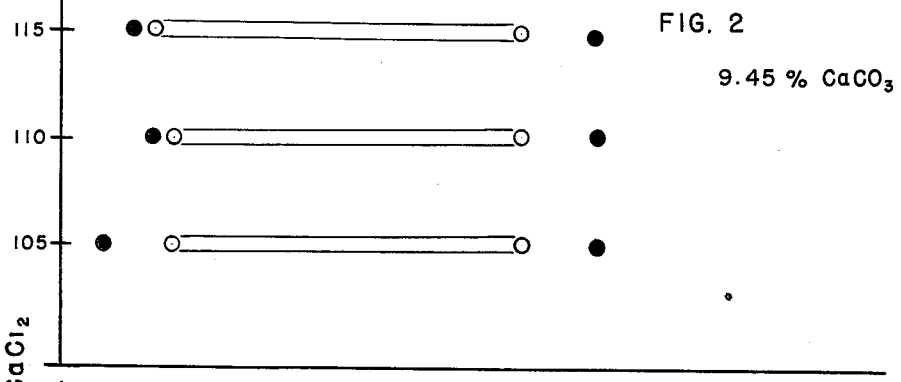
Figure 3:
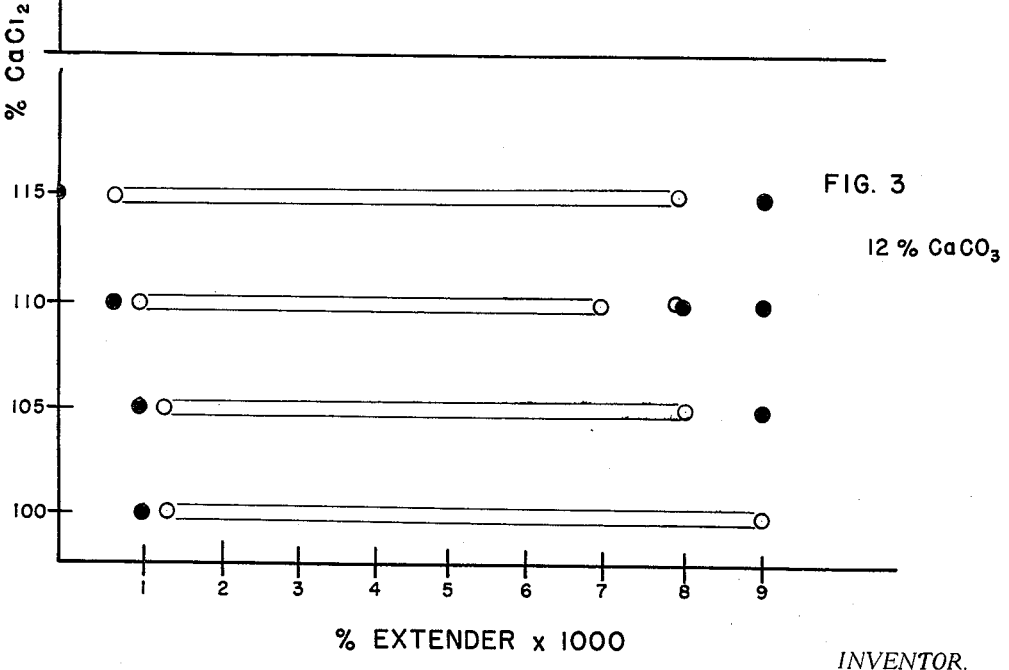

According to the invention, various quantities of calcium carbonate further increase the extender range. Figures 2 and 3 illustrate variance of the extender range with calcium chloride content, at 9.45 per cent and 12 per cent by weight calcium carbonate based on the calcium phosphate present.

Figures 4 and 5 illustrate the stable suspension area for quantities of suspender from 0.04 to 0.1 per cent, that is, the extender range at varying amounts of calcium phosphate suspending agent having 112 per cent calcium chloride additive. Here also 112% indicates the presence of 12% calcium chloride since 100% was utilized in preparing the calcium phosphate (Example V). Figure 4 is without calcium carbonate as a buffer, while Figure 5 is with 12 per cent calcium carbonate based on the calcium phosphate.

The processes of the invention are applicable to suspension polymerization of any polymerizable ethylenic monomer. By the term "polymerizable ethylenic monomer," it is intended to include any ethylenic compound which is polymerizable under the conditions of suspension polymerization, that is with or without catalysts, such as the peroxide type, for example, benzoyl peroxide, possibly under the influence of heat, and at subatmospheric, atmospheric or superatmospheric pressures. Combinations of two or more polymerizable monomers are also included, as well as those ethylenic compounds which will not polymerize by themselves but will do so in conjunction with other monomers.

More particularly, the invention is applicable to the polymerization of vinyl aryl monomers, such as styrene, ortho- or para-monochlorostyrenes, dichlorostyrenes and vinyl naphthalenes. By the processes of the invention it is possible to polymerize aromatic vinyl monomers to clear beads or pearls in concentrations of aqueous suspensions and to molecular weights higher than heretofore possible with a synthetic calcium phosphate as the dispersing agent.

The invention has been observed to have particular utility in the polymerization of styrene. Also, in place of styrene there may be used various polymerizable ethylenic monomers as will appear more fully in the examples below.

Benzoyl peroxide is the preferred catalyst. However, in place of benzoyl peroxide there may be substituted other polymerization catalysts. Preferably, the catalysts should be soluble in styrene or in whatever polymerizable ethylenic monomer is used. Thus, in place of benzoyl peroxide there may be used acetyl peroxide, tertiary-butyl hydroperioxide, ditertiary-butyl peroxide, lauryl peroxide, phthalyl peroxide, tetrahydrophthalyl peroxide, succinyl peroxide, etc. and combinations of these.

The invention is illustrated by, but not restricted to, the following preferred embodiments. A "normal" result indicates a product of clear polymer beads.

EXAMPLE I

Various polymerizations were conducted using synthetic calcium phosphate as a suspending agent.

Solutions of approximately 7.4 per cent trisodium phosphate and 20 per cent calcium chloride were prepared and filtered. The total amount of water was charged with the trisodium phosphate solution into a suitable reaction vessel. The temperature was adjusted to approximately 60° C. and the calcium chloride solution was added with agitation. After stirring for approximately 30–60 minutes, the extender, styrene, and benzoyl peroxide catalyst were added and the temperature raised to 90° C. over a period of one hour. The temperature cycle was 6.5 hours at 90° C. and 3.5 hours at 115° C.

Table I records the data from various suspension polymerizations and the data as plotted in Figure 1 illustrate the extender range as a function of per cent calcium chloride present.

TABLE I

*Extender range as function of $CaCl_2$*

| Run No. | Type [1] | T. S. P.[2] (wt. gms.), 7.5% Sol. | Equivalent CaCl[2] (wt. gms.), 20% Sol. | Percent | Extender[3] | Result |
|---|---|---|---|---|---|---|
| 1 | B | 238 | 102 | 105 | 0.0004 | Agglomerated. |
| 2 | A | 1,188 | 510 | 105 | 0.0015 | Normal. |
| 3 | A | 1,188 | 510 | 105 | 0.0035 | Do. |
| 4 | A | 1,188 | 510 | 105 | 0.0040 | Precipitated. |
| 5 | A | 1,188 | 535 | 110 | 0.00075 | Agglomerated. |
| 6 | A | 1,188 | 535 | 110 | 0.001 | Normal. |
| 7 | A | 1,188 | 535 | 110 | 0.0035 | Do. |
| 8 | A | 1,188 | 535 | 110 | 0.00375 | Precipitated. |
| 9 | A | 1,172 | 535 | 111.8 | 0.0003 | Normal. |
| 10 | A | 1,172 | 535 | 111.8 | 0.004 | Do. |
| 11 | A | 1,172 | 535 | 111.8 | 0.0045 | Precipitated. |
| 12 | A | 1,188 | 545 | 112 | 0.00076 | Normal. |
| 13 | C | 0.925 | 1.178 | 113 | 0 | Precipitated. |
| 14 | A | 1,188 | 559 | 115 | 0.00076 | Agglomerated. |
| 15 | A | 1,188 | 559 | 115 | 0.001 | Normal. |
| 16 | A | 1,188 | 559 | 115 | 0.004 | Do. |
| 17 | A | 1,188 | 559 | 115 | 0.0045 | Precipitated. |

[1] Type:
  A% 30 gal. total charge
  B% 5 gal. total charge
  C% 1 liter total charge
Charge:
  55 parts by weight styrene
  45 parts by weight water
  0.2 part by weight benzoyl peroxide based on styrene
  Calcium phosphate (see T. S. P.)
  Calcium chloride—varied
  T. S. P.—varied
[2] T. S. P.—trisodium phosphate.
[3] Extender (dodecylbenzene sodium sulfonate)—varied.

EXAMPLE II

As the data of Example I as plotted in Figure 1 showed that 12 per cent excess calcium chloride gave desirable results, various polymerizations were run to determine the operable extender ranges utilizing various quantities of suspension agent. The reaction conditions were those outlined in Example I. The data appear in Table II and are plotted in Figure 4.

TABLE II

*Stable extender ranges*

| Run No. | Calcium phosphate, percent on system | Extender [1] (percent) | Result |
|---|---|---|---|
| 1 | 0.04 | 0.0005 | Agglomerated. |
| 2 | 0.04 | 0.0006 | Noral. |
| 3 | 0.04 | 0.0015 | Do. |
| 4 | 0.04 | 0.00175 | Precipitated. |
| 5 | 0.1 | 0.0005 | Agglomerated. |
| 6 | 0.1 | 0.00075 | Normal. |
| 7 | 0.1 | 0.004 | Do. |
| 8 | 0.1 | 0.0045 | Precipitated. |

[1] Dodecylbenzene sodium sulfonate (Nacconol NRSF).
Charge: 30 gal. total charge
  55 parts by weight styrene
  45 parts by weight water
  0.2 percent by weight benzoyl peroxide (based on styrene)
  Calcium phosphate—varied
  Extender—varied

EXAMPLE III

Synthetic calcium phosphate prepared from triosodium phosphate and 112 per cent calcium chloride was compared with commercial calcium phosphate as a suspending agent. The reaction conditions were those outlined in Example I. The results are shown in Table III and, from the fact that substantially similar beads were obtained, show that 0.07 per cent synthetic calcium phosphate is the equivalent of 0.487 per cent commercial calcium phosphate. That is, that synthetic calcium phosphate at 12 per cent excess calcium chloride is effective in approximately one-seventh the amount of commercial calcium phosphate required.

TABLE III

*Comparison of commercial and synthetic phosphates*

| | Run No. | | | |
|---|---|---|---|---|
| | 1 | 2 | 3 | 4 |
| Styrene, gal | 15 | 15 | 13.75 | 13.75 |
| Distilled water, gal | 10 | 10 | 11.25 | 11.25 |
| Synthetic Calcium Phosphate: | | | | |
| Percent | | | 0.07 | 0.07 |
| Gms | | | 62.6 | 62.6 |
| Equivalent CaCl₂, 20% Sol.: | | | | |
| Percent | | | 112 | 112 |
| Gms | | | 382 | 382 |
| Trisodium Phosphate, 7.39% Sol., Gms | | | 832 | 832 |
| Commercial Calcium Phosphate: | | | | |
| Percent | 0.487 | 0.487 | | |
| Gms | 431 | 431 | | |
| Extender—Dodecylbenzyne Sodium Sulfonate: | | | | |
| Percent | 0.0016 | 0.0016 | 0.00175 | 0.00175 |
| Gms | 1.42 | 1.42 | 1.58 | 1.58 |
| Benzoyl Peroxide (based on styrene), percent | 0.204 | 0.204 | 0.2 | 0.2 |

*Screen analysis*

| | | | | |
|---|---|---|---|---|
| on 10 mesh | trace | trace | 4 | trace |
| 20 mesh | 16 | 34 | 20 | 9 |
| 30 mesh | 47 | 28 | 32 | 32 |
| 40 mesh | 13 | 9 | 22 | 28 |
| 50 mesh | 9 | 6 | 10 | 18 |
| 60 mesh | 4 | 2 | 8 | 8 |
| thru 60 mesh | 10 | 20 | 4 | 4 |

EXAMPLE IV

Various polymerizations were conducted using synthetic calcium phosphate with excess calcium chloride as a suspending agent and in addition calcium carbonate as a buffer. The procedure followed was that outlined in Example I and a total charge of 30 gallons was used. The carbonate was added to the phosphate slurry at the time of its preparation.

Table IV includes data on runs using 9.45 per cent calcium carbonate based on the calcium phosphate suspender (0.1 per cent). The amounts of calcium chloride and the extender were varied. The data are plotted in Figure 2.

Table V includes data on runs using 12 per cent calcium carbonate based on the calcium phosphate suspender (0.1 per cent). The amounts of calcium chloride and the extender were varied. The data are plotted in Figure 3.

TABLE IV

*Effect of 9.45 per cent CaCO₃ (based suspender) on excess CaCl₂ and extender*

| Run No. | Equivalent CaCl₂, Percent | Percent Extender—Dodecylbenzene sodium sulfonate | Results |
|---|---|---|---|
| 1 | 105 | 0.0006 | Agglomerated. |
| 2 | 105 | 0.0015 | Normal. |
| 3 | 105 | 0.006 | Do. |
| 4 | 105 | 0.007 | Precipitated. |
| 5 | 110 | 0.00125 | Agglomerated. |
| 6 | 110 | 0.0015 | Normal. |
| 7 | 110 | 0.006 | Do. |
| 8 | 110 | 0.007 | Precipitated. |
| 9 | 115 | 0.001 | Agglomerated. |
| 10 | 115 | 0.00125 | Normal. |
| 11 | 115 | 0.006 | Do. |
| 12 | 115 | 0.007 | Precipitated. |

TABLE V

*Effect of 12 per cent CaCO₃ (based suspender) on excess CaCl₂ and extender*

| Run No. | Equivalent CaCl₂, Percent | Percent Extender—Dodecylbenzene sodium sulfonate | Results |
|---|---|---|---|
| 1 | 100 | 0.001 | Agglomerated. |
| 2 | 100 | 0.00125 | Normal. |
| 3 | 100 | 0.009 | Do. |
| 4 | 105 | 0.001 | Agglomerated. |
| 5 | 105 | 0.00125 | Normal. |
| 6 | 105 | 0.008 | Do. |
| 7 | 105 | 0.009 | Precipitated. |
| 8 | 110 | 0.00075 | Agglomerated. |
| 9 | 110 | 0.001 | Normal. |
| 10 | 110 | 0.007 | Do. |
| 11 | 110 | 0.008 | Do. |
| 12 | 110 | 0.008 | Precipitated. |
| 13 | 110 | 0.009 | Do. |
| 14 | 115 | 0 | Precipitated. |
| 15 | 115 | 0.00075 | Normal. |
| 16 | 115 | 0.008 | Do. |
| 17 | 115 | 0.009 | Precipitated. |

EXAMPLE V

As the data of Example IV indicated that 12 per cent excess calcium chloride and 12 per cent calcium carbonate based on suspender gave desirable results, various polymerizations were run to determine the operable extender ranges utilizing various quantities of suspension agent. The procedure followed was that outlined in Example I. The calcium carbonate buffer was added to the phosphate slurry at the time of preparation. The data appear in Table VI and are plotted in Figure 5.

TABLE VI

*Stable extender ranges at 12 per cent CaCO₃*

| Run No. | Percent Calcium Phosphate on System | Extender,[1] (percent) | Result |
|---|---|---|---|
| 1 | [2] 0.1 | 0.0005 | Normal |
| 2 | [2] 0.1 | 0.0055 | Do. |
| 3 | [2] 0.1 | 0.007 | Precipitated |
| 4 | [3] 0.04 | 0.0005 | Normal |
| 5 | [3] 0.04 | 0.00225 | Do. |
| 6 | [3] 0.04 | 0.00275 | Precipitated |

[1] Extender—dodecylbenzene sodium sulfonate.
[2] Basic charge for 0.1% calcium phosphate:

| Material | Percent | Amount |
| --- | --- | --- |
| Styrene | 55 | 13.75 gal. |
| Water, distilled | 45 on | 11.25 gal. |
| Benzoyl peroxide | 0.2%/Styrene | 93.5 gm. |
| Trisodium phosphate | 0.1% Calcium Phosphate equiv. | 1,188 gm. soln. 7.39%. |
| Calcium chloride | 112% equiv. of Trisodium Phosphate. | 545 gm. soln. 20.30%. |
| Calcium carbonate | 12% of Calcium Phosphate. | 10.74 gm. |
| Dodecylbenzene sodium sulfonate | Variable | Variable. |

³ Basic charge for 0.04% calcium phosphate:

| Material | Percent | Amount |
| --- | --- | --- |
| Styrene | 55 | 13.75 gal. |
| Water, distilled | 45 on | 11.25 gal. |
| Benzoyl peroxide | 0.2%/Styrene | 93.5 gm. |
| Trisodium phosphate | 0.04% Calcium Phosphate equiv. | 475 gm. soln. 7.39%. |
| Calcium chloride | 112% equiv. of Trisodium Phosphate | 218 gm. soln. 20.30%. |
| Calcium carbonate | 12% of Calcium Phosphate | 4.3 gm. |
| Dodecylbenzene sodium sulfonate | Variable | Variable. |

EXAMPLE VI 450 gallons distilled water were heated to 60° C. in a 1000 gallon reactor and there was added with agitation 36.1 lbs. of trisodium phosphate solution having a specific gravity of 1.086 at 30° C. (2.67 lbs. T. S. P. on dry basis). To this was added with agitation 17.2 lbs. of calcium chloride solution having a specific gravity of 1.182 at 30° C. (3.46 lbs. calcium chloride on dry basis). The agitation was stopped and there was added 570 gallons styrene and 32.5 gms. dodecylbenzene sodium sulfonate. Agitation was resumed and the mixture heated so there was a temperature rise of approximately 1° C. per minute until the temperature was in the range 75–80° C. The temperature was held there until good dispersion was observed and there was added 8 lbs. 6 oz. benzoyl peroxide. The temperature was raised to and held at 90–94° C. for 6½ to 7 hours and 144 gms. calcium carbonate was added at the sixth hour of heating. The temperature was then raised to 115°±2° C. for 3½ hours. Clear polymer beads were obtained.

EXAMPLE VII

Example VI is repeated except that for the quantities of water and styrene there recited there is used 2000 lbs. water and 5940 lbs. styrene. Clear polymer beads are obtained. It will be noted that the monomer-water ratio here employed is 3:1.

EXAMPLE VIII

The various runs set out in Example II are repeated except that the charge is comprised of 75 parts by weight of styrene and 25 parts by weight of water. Substantially similar results are obtained.

EXAMPLE IX

Example V is repeated except for the quantities of water and styrene there recited there are used 18.7 gallons styrene and 6.3 gallons water. Clear polymer beads are obtained. It will be noted that the monomer-water ratio here employed is 3:1. Also, the calcium phosphate suspender is utilized (in Runs 4, 5, and 6) in an amount equivalent to 0.053 per cent by weight based on the styrene.

While the invention has been illustrated with particular reference to styrene as the polymerizable ethylenic monomer, calcium phosphate with calcium chloride additive as the dispersing agent, dodecylbenzene sodium sulfonate as the extender, and calcium carbonate as a buffer, it will be realized that other like materials may be used in their places. For example, in place of dodecylbenzene sodium sulfonate there may be substituted the surface-active agents noted above, as well as many others of the anionic type, especially the highly active surface-active agents such as the organic sulfonates, sulfates and carboxylates, each organic residue of which contains one or more alkyl groups totaling up to about 18 carbon atoms, and preferably containing more than 6 carbon atoms.

Also, in place of styrene there may be used various polymerizable ethylenic monomers including ortho-chlorostyrene; para-chlorostyrene; 2,6-dichlorostyrene; 2,4-dichlorostyrene; 2,5-dichlorostyrene; 2,3-dichlorostyrene; 3,4-dichlorostyrene; the higher polychlorostyrenes; para-methylstyrene; ortho-methylstyrene; meta-methylstyrene; ethyl vinyl benzenes; 4-vinyl pyridine; vinyl naphthalene; the mixtures of these with each other or with styrene; or other copolymerizing material such as acrylonitrile; fumaronitrile; maleimide; methyl-methacrylate; butyl acrylate; divinylbenzene; isopropenylbenzene; polychloro ring-substituted isopropenylbenzene; para-isopropenyldiphenyl; para-vinyldiphenyl; methacrylonitrile; acrylic acid; butadiene; isoprene; 2,3-dimethylbutadiene; 2-chlorobutadiene-1,3; vinylidene chloride; vinyl chloride; etc.

It will be noted that various polymerizable compositions of two or more of the above recited monomers are included within the scope of the invention. Thus, combinations of two, three, four, five, or more monomers can be copolymerized utilizing the present invention. The only limitation is that there be in the polymerizable composition at least one ethylenic monomer polymerizable per se. Examples of copolymers are styrene and dichlorostyrene, styrene and acrylonitrile, styrene and lauryl methacrylate, styrene and acrylic acid, styrene and vinylidene chloride, styrene and butylacrylate, divinylbenzene and dichlorostyrene, divinylbenzene and acrylonitrile, vinyl chloride and styrene, and vinyl chloride and vinylidene chloride.

Polymers of three monomers are, for example, styrene, acrylonitrile and divinylbenzene; styrene, 4-vinylpyridine and 2,6-dichlorostyrene; styrene, acrylonitrile and 4-vinylpyridine; 2,6-dichlorostyrene, isopropenylbenzene and methyl methacrylate; and divinylbenzene, 2,4-dichlorostyrene and 4-vinylpyridine.

Other copolymers are tetrapolymers obtained by the polylerization of, for example, styrene, acrylonitrile, divinylbenzene and 4-vinylpyridine; dichlorostyrenes, isopropenylbenzene, methyl methacrylate and styrene; and styrene, acrylic acid, methacrylonitrile and para-vinyldiphenyl.

Examples of copolymers derived from mixtures of a higher number of monomers are the polymerization products of such mixtures as styrene, p-chlorostyrene, 2,6-dichlorostyrene, acrylonitrile, p-methylstyrene, vinylnaphthalene, and butyl acrylate and styrene, divinylbenzene, 4-vinylpyridine, vinylidene chloride, acrylonitrile, methyl methacrylate, and isopropenylbenzene. Still other examples are the polymerization products of such mixtures as (1) styrene, ortho-chlorostyrene, 3,4-dichlorostyrene, para-methylstyrene, 4-vinyl pyridine, butyl acrylate, divinylbenzene, acrylic acid, and isoprene, (2) styrene, ortho-chlorostyrene, 3,4-dichlorostyrene, acrylonitrile, methyl methacrylate, divinylbenzene, para-isopropenyldiphenyl, and para-vinyldiphenyl, (3) styrene, orthochlorostyrene, 3,4-dichlorostyrene, acrylonitrile, methyl methacrylate, divinylbenzene, para-isopropenyldiphenyl, para-vinyldiphenyl, methacrylonitrile, vinylidene chloride, acrylic acid, and isoprene, and (4) styrene, ortho-chlorostyrene, 3,4-dichlorostyrene, acrylonitrile, methyl methacrylate, divinylbenzene, para-isopropenyldiphenyl, para-vinyldiphenyl, maleimide, butyl acrylate, methacrylonitrile, and 2-chlorobutadiene-1,3.

EXAMPLE X 83.3 lbs. distilled water is heated to approximately 60° C. in a 30-gallon kettle and there are added with agitation 1188 gms. of a 7.39 per cent solution of trisodium phosphate. To this is added with stirring 545 gms. of a 20.3 per cent solution of calcium chloride. After stirring for approximately 30–60 minutes, 2.71 gms. dodecylbenzene sodium sulfonate, 112 lbs. styrene, and 127.7 gms. benzoyl peroxide are added and the temperature raised to 90° C. over a period of one hour. The temperature is maintained at approximately 90° C. for 6–7 hours and stirring continued and at the sixth hour 10.74 gms. calcium carbonate is added. After heating at 90° C., the temperature is raised to 115° C. for approximately 3.5 hours. Clear polymer beads are obtained.

EXAMPLE XI

Following the procedure outlined in Example X and utilizing the quantities there employed except substituting for the dodecylbenzene sodium sulfonate there used an equal weight of sodium oleate, there are obtained clear polymer beads.

EXAMPLE XII

Following the procedure outlined in Example X and utilizing the quantities there employed except substituting for the styrene there used an equal weight of mixed dichlorostyrenes, there are obtained clear polymer beads.

EXAMPLE XIII

Following the procedure outlined in Example X and utilizing the quantities there employed except substituting for the styrene there used an equal weight of 4-vinyl pyridine, there are obtained clear polymer beads.

EXAMPLE XIV

Following the procedure outlined in Example X and utilizing the quantities there employed except substituting for the styrene there used an equal weight of methyl methacrylate, there are obtained clear polymer beads.

EXAMPLE XV

Following the procedure outlined in Example X and utilizing the quantities there employed except substituting for the styrene there used an equal weight of vinyl naphthalene, there are obtained clear polymer beads.

EXAMPLE XVI

Following the procedure outlined in Example X and utilizing the quantities there employed except substituting for the styrene there used an equal weight of ortho-monochlorostyrene, there are obtained clear polymer beads.

EXAMPLE XVII

Following the procedure outlined in Example X and utilizing the quantities there employed except substituting for the styrene there used an equal weight of a mixture of 54 parts styrene and 6 parts acrylonitrile, there are obtained clear polymer beads.

EXAMPLE XVIII

Following the procedure outlined in Example X and utilizing the quantities there employed except substituting for the styrene there used an equal weight of a mixture of 57 parts styrene and 3 parts lauryl methacrylate, there are obtained clear polymer beads.

EXAMPLE XIX

Following the procedure outlined in Example X and utilizing the quantities there employed except substituting for the styrene there used an equal weight of a mixture of 39 parts styrene and 21 parts dichlorostyrene (mixed isomers), there are obtained clear polymer beads.

EXAMPLE XX

Following the procedure outlined in Example X and utilizing the quantities there employed except substituting for the styrene there used an equal weight of a mixture of 54 parts styrene and 6 parts acrylic acid, there are obtained fine yellow polymer beads.

EXAMPLE XXI

Following the procedure outlined in Example X and utilizing the quantities there employed except substituting for the styrene there used an equal weight of a mixture of 25 parts styrene and 25 parts vinylidene chloride, there are obtained clear polymer beads.

EXAMPLE XXII

Following the procedure outlined in Example X and utilizing the quantities there employed except substituting for the styrene there used an equal weight of a mixture of 54 parts styrene and 6 parts butyl acrylate, there are obtained clear polymer beads.

EXAMPLE XXIII

Following the procedure outlined in Example X and utilizing the quantities there employed except substituting for the styrene there used an equal weight of a dehydrogenated diethylbenzene mixture containing 30 per cent divinylbenzene and 70 per cent other products of the dehydrogenation, there are obtained clear polymer beads.

EXAMPLE XXIV

Acrylonitrile was polymerized using synthetic calcium phosphate with excess calcium chloride as a suspending agent and in addition calcium carbonate as a buffer. Solutions of approximately 7.6 per cent trisodium phosphate and 20 per cent calcium chloride were prepared. Approximately 300 grams water containing the desired amount of trisodium phosphate was charged into one liter glass flasks. The temperature was adjusted approximately to 60° C. and there was added with stirring quantities of calcium chloride solution equivalent to 112 per cent of the phosphate utilized. Then there was added in the amounts below indicated the extender, acrylonitrile equal to the volume of water and benzoyl peroxide. The polymerizations were carried out under a blanket of nitrogen and with stirring. The results are indicated in Table VII:

TABLE VII
*Total charge—600 grams*

| Run No. | Percent Calcium Phosphate | Result |
|---|---|---|
| 1 | 0.05 | Fine hard beads. |
| 2 | 0.04 | Precipitated. |

Charge in percent:
    Acrylonitrile_____50.
    Water_____50.
    Extender (Nacconol NRSF)_____0.0025.
    Benzoyl peroxide_____0.2 (based on styrene).
    Calcium phosphate_____Varied.

EXAMPLE XXV

Vinyl acetate was polymerized following the procedure outlined in Example XXIV, except that the temperature of polymerization was 50° C. The results are indicated in Table VIII:

TABLE VIII
*Total charge—600 grams*

| Run No. | Percent Calcium Phosphate | Result |
|---|---|---|
| 1 | 0.10 | ⅛″ hard beads—30 hours. |
| 2 | 0.05 | Precipitated. |

Charge in percent:
    Acrylonitrile_____50.
    Water_____50.
    Extender (Nacconol NRSF)_____0.0025.
    Benzoyl peroxide_____0.2 (based on styrene).
    Calcium phosphate_____Varied.

It will be realized that the temperature utilized in the two foregoing examples was dictated by the boiling point of the monomer being polymerized, and that in general the temperature of polymerization of a given monomer is carried out at below its boiling point.

While the invention has been described with reference to particular embodiments thereof, it will be understood that in its broader aspects the invention is not limited thereto, but the invention may be variously embodied within the scope of the invention as is set forth herein and in the appended claims.

I claim:

1. In a process for preparing polymer beads the step of polymerizing in a stable aqueous suspension a polymerizable composition comprising at least one polymerizable ethylenic monomer, said suspension being stabilized during polymerization by means of a synthetic calcium phosphate prepared by a metathetical reaction wherein said phosphate is precipitated, an anionic surface-active agent, calcium chloride in an amount of from 5–15% by weight where 100% equals 10 moles calcium chloride per 6 molecular equivalents of phosphate radical ($PO_4$) present in the phosphate and calcium carbonate in an amount of from about 1 to 15% by weight of the calcium phosphate present.

2. The process of claim 1 in which the polymerizable composition comprises a vinyl aromatic compound.

3. The process of claim 1 in which the polymerizable composition comprises styrene.

4. The process comprising admixing in a reaction vessel suitable for polymerization 40 parts distilled water, trisodium phosphate solution equivalent to 0.04 to 0.5 part tricalcium phosphate, calcium chloride in an amount from 105 per cent to 115 per cent (100 per cent equals 10 moles calcium chloride per 6 molecular equivalents phosphate radical present), an anionic surface-active agent in an amount from 0.001 to 0.008 part, 60 parts of a polymerizable composition comprising at least one ethylenic monomer, and a polymerization catalyst, agitating said mixture while it is heated to, and maintained at, 90–94° C. for from 6 to 7 hours, adding to the mixture 5–15 per cent calcium carbonate based on the calcium phosphate present at the sixth hour, agitating and heating said mixture for 3–4 hours at a temperature from 110° to 115° C., and recovering the bead polymers so obtained.

5. The process comprising admixing in a reaction vessel suitable for polymerization 40 parts distilled water, trisodium phosphate solution equivalent to 0.04 part tricalcium phosphate, calcium chloride in an amount of 112 per cent (100 per cent equals 10 moles calcium chloride per 6 molecular equivalents phosphate radical present), from 0.001 to 0.008 part dodecylbenzene sodium sulfonate, 60 parts styrene and 0.1 part benzoyl peroxide based on the styrene, agitating said mixture while it is heated to, and maintained at, 90–94° C. for from 6 to 7 hours, adding to the mixture 12 per cent calcium carbonate based on the calcium phosphate present at the sixth hour, heating said mixture for 3–4 hours at a temperature from 110° to 115° C., recovering the bead polymers so obtained.

6. The process of claim 17 in which the polymerizable composition comprises a vinyl aromatic compound.

7. The process of claim 17 in which the polymerizable composition comprises styrene.

8. The process of claim 18 in which the polymerizable composition comprises a vinyl aromatic compound.

9. The process of claim 18 in which the polymerizable composition comprises styrene.

10. In a process for preparing polymer beads the step of polymerizing a polymerizable composition comprising at least one ethylenic monomer while said polymerizable composition is suspended in water, said water suspension being stabilized during the polymerization by means of at least 0.035 per cent by weight based on the polymerizable composition of a synthetic calcium phosphate prepared from trisodium phosphate and 105–115 per cent by weight calcium chloride where 100 per cent equals 10 moles calcium chloride per 6 moles trisodium phosphate, and containing said excess calcium chloride, and in which said phosphate is extended by an anionic surface-active agent, in which process the ratio in parts by weight of polymerizable composition to water is no more than about 3:1.

11. The process of claim 10 in which the polymerizable composition comprises a vinyl aromatic compound.

12. The process of claim 10 in which the polymerizable composition comprises styrene.

13. In a process for preparing polymer beads the step of polymerizing a polymerizable composition comprising at least one ethylenic monomer while said polymerizable composition is suspended in water, said water suspension being stabilized during the polymerization by means of at least 0.035 per cent by weight based on the polymerizable composition of a synthetic calcium phosphate prepared from trisodium phosphate and 105–115 per cent by weight calcium chloride where 100 per cent equals 10 moles calcium chloride per 6 moles trisodium phosphate and containing said excess calcium chloride, said phosphate being present in an amount of from about 0.04 per cent to 0.5 per cent by weight based on the polymerizable composition and in which said phosphate is extended by dodecylbenzene sodium sulfonate in an amount from about 0.001 to 0.004 per cent by weight of the suspension in which process the ratio in parts by weight of polymerizable composition to water is no more than about 3:1.

14. The process of claim 13 in which the polymerizable composition comprises a vinyl aromatic compound.

15. The process of claim 13 in which the polymerizable composition comprises styrene.

16. The process of claim 15 in which there is used 112% calcium chloride.

17. In a process for preparing polymer beads the step of polymerizing in a stable aqueous suspension a polymerizable composition comprising at least one polymerizable ethylenic monomer, said suspension being stabilized during the polymerization by means of a synthetic calcium phosphate prepared by a metathetical reaction wherein said phosphate is precipitated, an anionic surface-active agent, and calcium chloride in an amount of from 5–15% by weight where 100% equals 10 moles calcium chloride per 6 molecular equivalents of phosphate radical ($PO_4$) present in the phosphate.

18. In a process for preparing polymer beads the step of polymerizing in a stable aqueous suspension a polymerizable composition comprising at least one polymerizable ethylenic monomer, said suspension being stabilized during the polymerization by means of a synthetic calcium phosphate prepared by a metathetical reaction wherein said phosphate is precipitated, dodecylbenzene sodium sulfonate, and 12% calcium chloride by weight where 100% equals 10 moles calcium chloride per 6 molecular equivalents of phosphate radical ($PO_4$) present in the phosphate.

19. In a process for preparing polymer beads the step of polymerizing a polymerizable composition comprising at least one ethylenic monomer while said polymerizable composition is suspended in water, said water suspension being stabilized during the polymerization by means of at least 0.035 per cent by weight based on the polymerizable composition of a synthetic calcium phosphate prepared from calcium hydroxide and phosphoric acid, 5–15 per cent by weight calcium chloride where 100 per cent equals 10 moles calcium chloride per 6 moles phosphate radical and in which said phosphate is extended by an anionic surface active agent in which process the ratio in parts by weight of polymerizable composition to water is no more than about 3:1.

20. The process of claim 19 in which the polymerizable compostion comprises a vinyl aromatic compound.

21. The process of claim 19 in which the polymerizable composition comprises styrene.

22. The process of claim 21 in which the anionic surface active agent is dodecylbenzene sodium sulfonate in an amount of from about 0.001 to 0.004 per cent by weight of the suspension.

References Cited in the file of this patent

UNITED STATES PATENTS

| | | |
|---|---|---|
| 2,524,627 | Hohenstein | Oct. 3, 1950 |
| 2,552,327 | Kropa | May 8, 1951 |

FOREIGN PATENTS

| | | |
|---|---|---|
| 659,771 | Great Britain | Oct. 24, 1951 |

OTHER REFERENCES

Mellor: "Modern Inorganic Chemistry," page 633 (1939).